W. P. KIDDER & C. W. SPONSEL.
CARRIAGE SHIFTING MECHANISM FOR TYPE WRITING MACHINES.
APPLICATION FILED SEPT. 11, 1905. RENEWED JUNE 5, 1913.

1,084,347.

Patented Jan. 13, 1914.
4 SHEETS—SHEET 1.

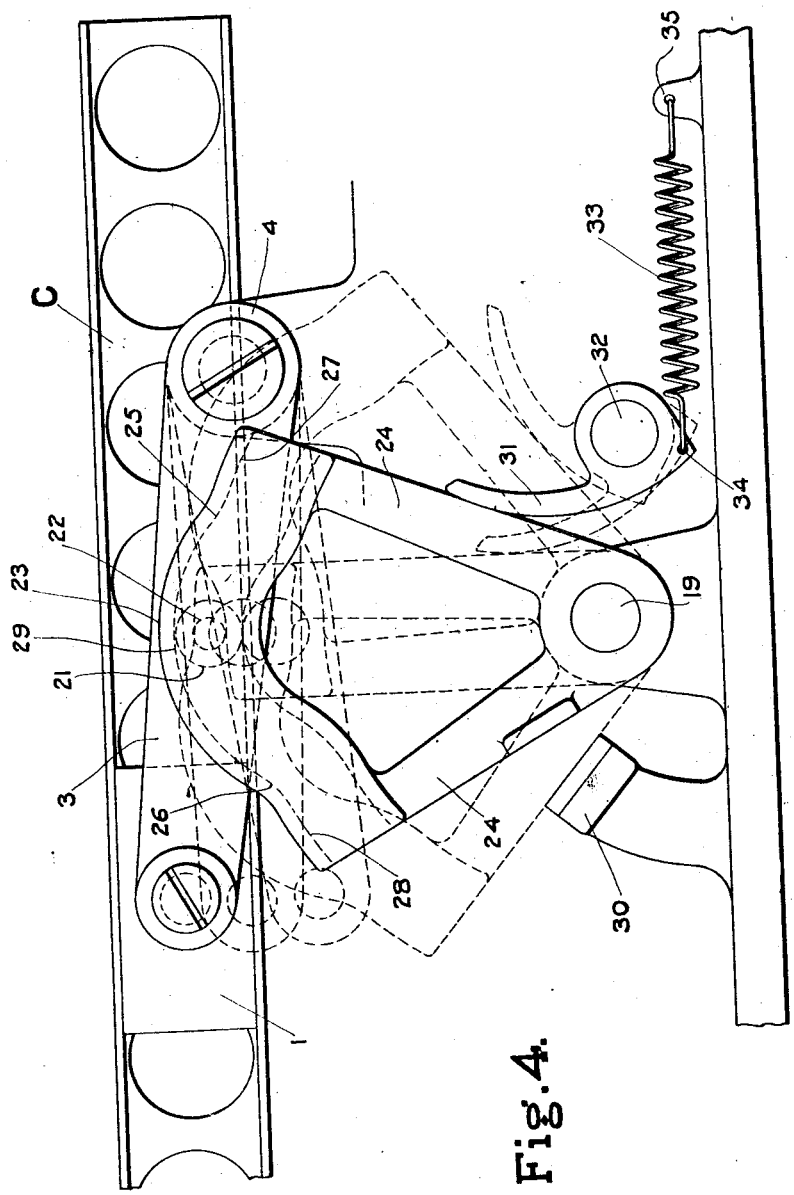

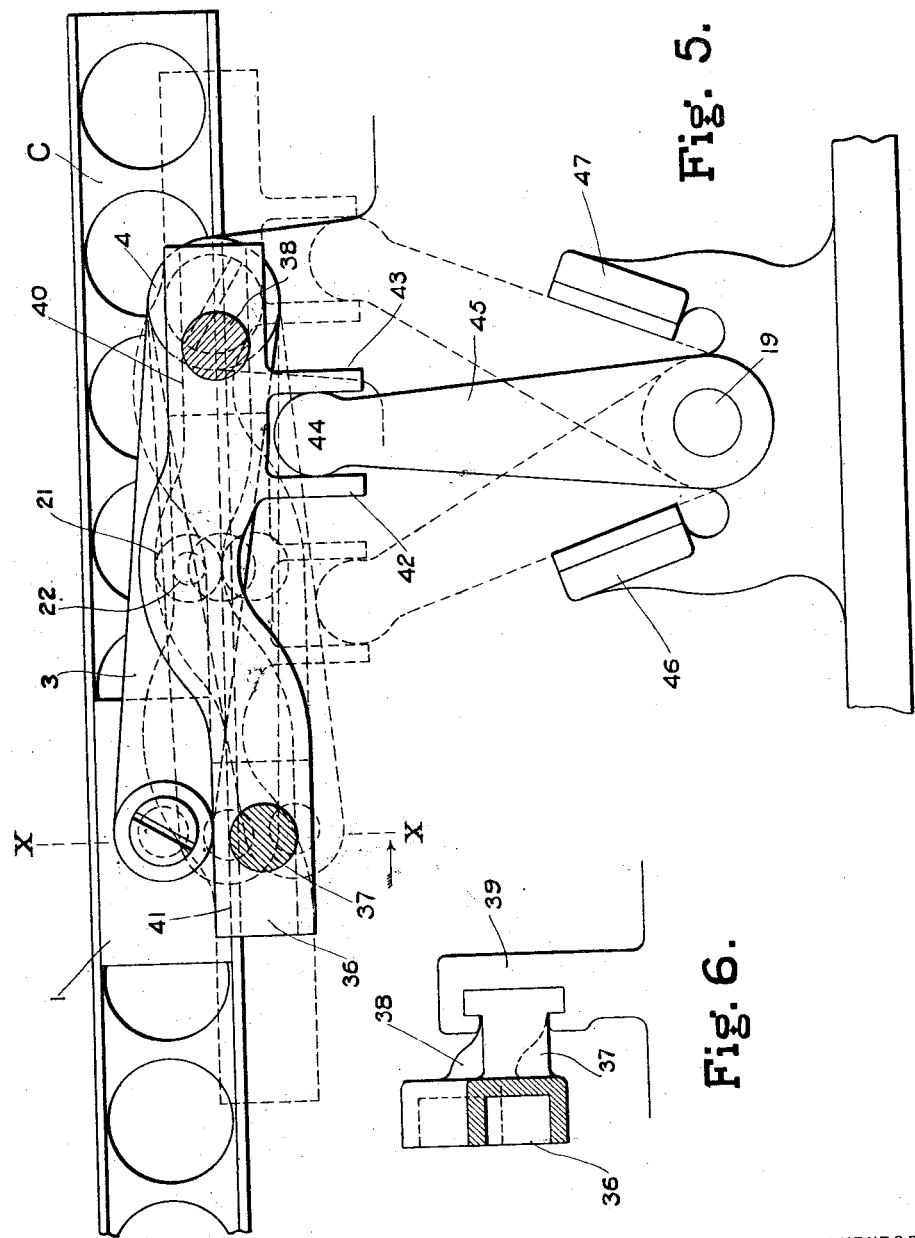

UNITED STATES PATENT OFFICE.

WELLINGTON P. KIDDER, OF BOSTON, MASSACHUSETTS, AND CHARLES W. SPONSEL, OF HARTFORD, CONNECTICUT, ASSIGNORS, BY MESNE ASSIGNMENTS, TO THE NOISELESS TYPEWRITER COMPANY, OF MIDDLETOWN, CONNECTICUT, A CORPORATION OF CONNECTICUT.

CARRIAGE-SHIFTING MECHANISM FOR TYPE-WRITING MACHINES.

1,084,347. Specification of Letters Patent. Patented Jan. 13, 1914.

Application filed September 11, 1905, Serial No. 277,913. Renewed June 5, 1913. Serial No. 772,003.

*To all whom it may concern:*

Be it known that we, WELLINGTON P. KIDDER and CHARLES W. SPONSEL, residing, respectively, at Boston, in the county of Suffolk and State of Massachusetts, and Hartford, in the county of Hartford and State of Connecticut, have invented certain new and useful Improvements in Carriage-Shifting Mechanism for Type-Writing Machines, of which the following is a full, clear, and exact description, such as will enable others skilled in the art to which it appertains to make and use the same.

This invention relates to typewriting machines and the like and, although capable of employment in a variety of relations in machines of other types, is more especially adapted for use in connection with those known as "silent typewriters".

It has for one of its objects the provision of means whereby the machine will operate substantially without noise.

Another object is the provision of mechanism adapted silently to shift the carriage from initial position to other position.

Other objects will be in part obvious and in part pointed out hereinafter.

The invention accordingly consists in the features of construction, combinations and elements and arrangement of parts which will be exemplified in the mechanism hereinafter described, and the scope of the application of which will be indicated in the following claims.

Figure 1:
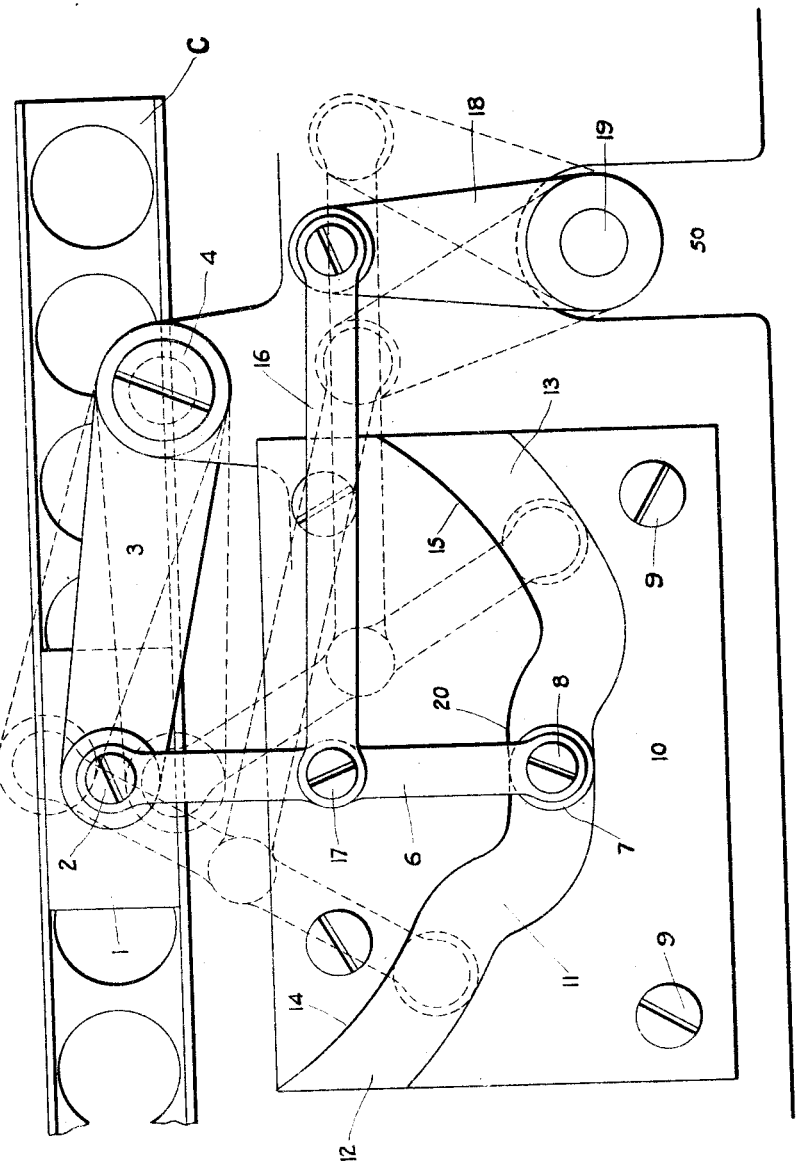
Figure 2:
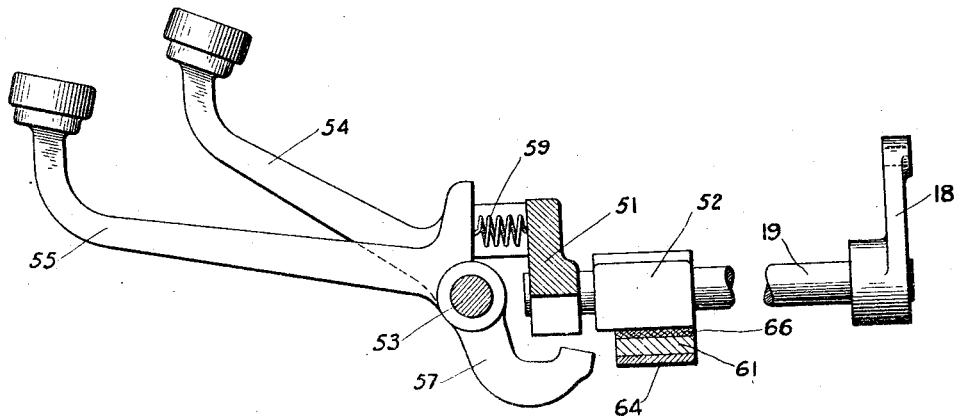
Figure 3:
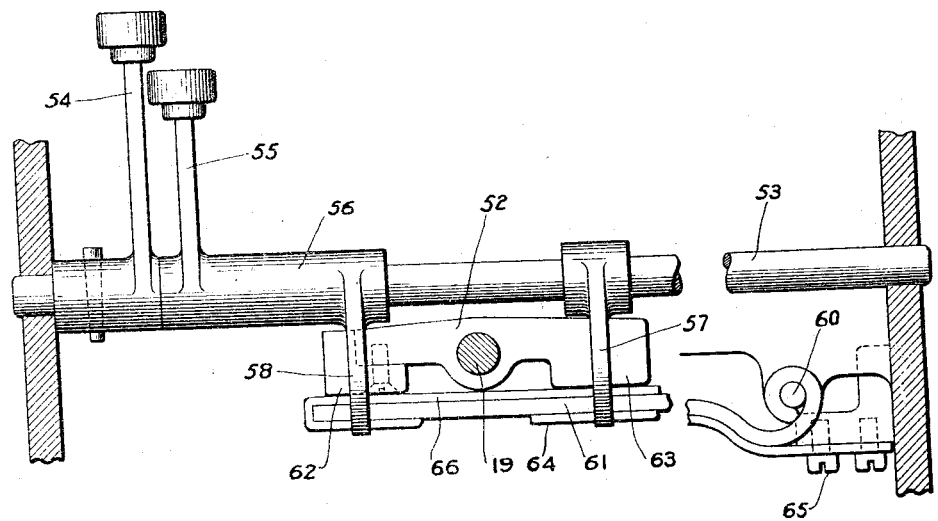

In the accompanying drawings, wherein are illustrated several of the various possible embodiments of our invention, Figure 1 is an elevation showing a portion of our preferred embodiment of the same. Fig. 2 is a side elevation of a portion of the machine showing the levers for shifting the carriage. Fig. 3 is an end elevation of the mechanism shown in Fig. 2. Fig. 4 is an elevation of another embodiment of the same. Fig. 5 is a similar view of still another embodiment of the same. Fig. 6 is a sectional view on line x—x of Fig. 5 showing guiding means for the sliding cam.

Similar reference characters refer to similar parts throughout the several views of the drawings.

Preliminary to a description of the more specific features of our invention, and in order that the objects thereof may be more easily understood, it may here be noted that, in typewriters having a comparatively small number of keys and requiring the arrangement of the printing characters in several groups, it is usually necessary that means be provided to shift the carriage to several positions in order to employ printing characters from any one of the several groups. We have, therefore, found it desirable in the production of a machine which will operate in all respects substantially without noise, to provide mechanism designed to shift the carriage from initial position to other positions such that during the operation thereof impact or concussion is practically eliminated, thus insuring a silent operation. The above and other advantages are secured in constructions of the nature of that hereinafter described.

Referring now to the drawings and to Figs. 1, 2 and 3, there is shown in Fig. 1 at C a channel bar comprising a portion of the carriage of a typewriting machine having slidably mounted therein a block 1, to which is pivotally attached at 2 a lever 3 pivoted in turn to the framework of the machine at 4. Pivotally mounted upon lever 3 at 2 is a swinging lever 6 carrying at its lower end a roller 7 journaled thereon at 8. Secured to the frame of the machine, as by screws 9, is a fixed cam 10 having therein a sinuous cam groove 11, which groove roller 7 journaled upon swinging lever 6 is adapted to traverse. Groove 11 therefore comprises a cam path for roller 7 and, in this instance, has two portions or cams 12 and 13 suitably joined by a gradually curved surface, in order that roller 7 may easily be projected along the entire extent of the cam path. Cams 12 and 13 are arranged at different distances from the carriage, when the same is in its normal or initial position, and each of said cams 12 and 13 is provided with a slight dwell 14 and 15 respectively, the purpose of which will be apparent hereinafter. Link 16 is pivotally connected with swinging lever 6 at 17 and is also pivotally connected with arm 18 fixedly secured to rock shaft 19. Rock shaft 19 is suitably journaled in the frame of the machine at 50 and 51 and is adapted to be rocked in either direction by suitable means presently to be described. Fixedly secured to the opposite end of rock shaft 19 is a rocker member 52 adapted, when the carriage is in initial position, to assume a horizontal position, as clearly shown in Fig. 3. Mounted upon a rod 53 extending transversely of the machine and journaled in the side walls thereof are shift levers 54 and 55. Shift lever 54 is keyed to rod 53, and shift lever 55 is integrally mounted upon a sleeve 56 which is rotatably mounted upon rod 53. A lever arm 57 is fixedly secured to rod 53 and a similar lever arm 58 is integrally connected to sleeve 56 journaled upon rod 53. Lever arms 57 and 58 extend downwardly and inwardly to a position adjacent the free ends of rocker member 52 and normally assume the position shown in Fig. 2 of the drawings, and are maintained in such position by means of retractile springs 59 connecting the said shift levers 54 and 55 with a fixed part of the frame of the machine. The length of the lever arms 57 and 58 is such that, when one of shift levers 54 or 55 is depressed, the lever arm connected therewith will engage with rocker member 52 near the end thereof, causing the same to rock upwardly, the opposite end partaking of a correspondingly downward movement but clearing the other lever arm. It will be understood that, when either of the lever arms 57 or 58 is raised, inasmuch as the same travels in the arc of a circle, said lever arm will engage said member 52 near one of its free ends, as hereinbefore explained. As shown in Fig. 1, the carriage is in initial position with roller 7 occupying a slight dwell 20 intermediate cams 12 and 13. With the parts in this position, rocker member 52 of rock shaft 19 is in a horizontal position, as shown in Figs. 2 and 3. In order to insure the return of the carriage to its initial position when shifted to other positions, we have provided mechanism co-acting with rocker member 52 of such construction as to achieve this result. Journaled upon a stud 60 extending from the frame of the machine is a tilt bar 61, the upper surface of which is normally adapted to contact with the lower surfaces of downwardly projecting ends 62 and 63 of rocker member 52. A leaf spring 64 secured by screws 65 to the frame of the machine co-acts with tilt bar 61 to maintain the same against the said downwardly projecting ends of rocker member 52. A cushion 66 of relatively resilient material is interposed between the upper surface of tilt bar 61 and the lower surfaces of rocker member 52.

Although from the above description the operation of the above preferred embodiment of our invention should be largely obvious, the same is substantially as follows: A rotation of rock shaft 19 in either direction by the proper shift lever will, through arm 18 and link 16, cause swinging lever 6 to project roller 7 along the cam path in fixed cam 10. Cam 13 being at a greater distance from the carriage when in its normal or initial position than the point in the cam path occupied by roller 7 when the carriage is in such position, a swinging of lever 6 to the right will operate, therefore, to shift the carriage from initial position to a second position, and cam 12 occupying a position nearer to the carriage than that occupied by roller 7 when the carriage is in initial position, a swinging of lever 6 to the left will, consequently, operate to shift the carriage from initial position to a third position. Dwells 14, 15 and 20 serve to determine the position of the carriage in its several positions and are so shaped that a slight movement of roller 7 along one of the same will in no wise affect the vertical disposition of the carriage. It will be understood that a partial rotation of rock shaft 19 in either direction by means of either of lever arms 57 or 58 connected to its respective shift lever will cause spring-controlled tilt bar 61 to be projected downwardly, but, upon a releasing of pressure from either of said shift levers, said tilt bar acting upon rocker member 52 will cause the same to return to its normal horizontal position, spring 64 serving to maintain the parts normally in this position.

In Fig. 4 we have illustrated another embodiment of our invention in which a roller 21 is journaled upon stud 22 extending from lever 3 intermediate its ends. Rocking cam 23 is carried by double armed lever 24 fixedly secured to rock shaft 19, and is provided with a cam path in which roller 21 is adapted to travel. Cams 25 and 26 are arranged, as in the embodiment hereinbefore described, at different distances from the carriage, and it should be understood that a rocking of lever 24 by rock shaft 19 under application of pressure to the shift levers will operate to shift the carriage from initial position to a second or third position, dwells 27, 28 and 29 operating to determine such positions. Dwells 27, 28 and 29 also in this instance are so shaped that a slight movement of the co-acting roller 21 to the right or left will not affect the vertical disposition of the carriage. As will be apparent, this result may be secured by making the cam path at this point concentric to the pivotal center of lever 24. Secured to the frame of the machine is a cushioned stop 30 adapted to limit the movement of lever 24 in one direction, as shown in the dotted lines at the left of Fig. 3, and at the opposite side of lever 24 a wiper cam 31 pivoted at 32 to a fixed part of the machine, is adapted, under the influence of spring 33 attached at 34 to said cam and at 35 to a fixed part of the machine, to maintain a constant sliding engagement with lever 24 and to arrest the movement thereof in the correspondingly opposite position, as shown by the dotted lines to the right of Fig. 3.

In the embodiment shown in Figs. 5 and 6 of the drawings we have provided a reciprocating cam 36 provided with headed, integral projections 37 and 38, which are adapted to slide horizontally in guide 39 positioned upon the frame of the machine. Cam 36 is provided with a cam path having two straight horizontally arranged surfaces 40 and 41, and in said cam path cam roller 21 journaled upon stud 22 extending from lever 3 is adapted to travel. When the carriage is in initial position, cam roller 21 occupies the middle or uppermost portion of cam 36. Positioned between depending lugs 42 and 43 upon cam 36 is a preferably enlarged rounded head 44 of a rocking lever 45 fixedly secured upon rock shaft 19. Rock shaft 19 is, as above indicated, adapted to be rocked either to the right or to the left by the shift levers and, in this instance, to rock lever 45 against cushioned stops 46 and 47, which stops operate to arrest the movement of lever 45 in either direction. Cam 36 being fixed against vertical movement, as hereinbefore explained, will, upon a reciprocating movement in either direction, cause roller 21 to follow the cam path, thereby shifting the carriage to either a second or third position, depending upon the direction of reciprocation, and in either of its shifted positions, the straight horizontal portions 40 and 41 of the cam path will operate to determine such positions.

It will be understood, of course, that the present arrangement of cams, or the shape of the cam paths, in any of the embodiments above described is purely arbitrary and many other forms could readily be devised, as will be apparent, thus, for instance, to allow a shifting of the carriage by a movement in one direction from initial position to two other positions, or upon a movement from a central position to a position at either side thereof, the cam roller, when the carriage is in the shifted position, being at a greater distance from the carriage than when the carriage is in initial position. And it should be obvious, also, that the mechanism herein described is capable of being adapted to a different arrangement, wherein there is provided a carriage fixed against vertical movement, with the further provision of a vertically reciprocating series of printing devices, the same comprising the type basket.

While we do not limit ourselves to any particular material, we have found it advantageous to harden the surfaces of the cam grooves and the co-acting rollers in the several relations shown.

Accordingly, it will appear that we have devised a mechanism well adapted to accomplish the objects of our invention and, by reason of the elimination of concussion or impact of moving parts, noise in the operation thereof is reduced to a minimum and, moreover, the mechanism is characterized by simplicity of structure and efficiency of action, the several advantages being inherent in all embodiments herein shown.

While we have shown and described our invention in connection with the machines of the above type, we do not wish to be understood as being limited exclusively to such type, as many of the features are capable of use in various relations in other forms of machines, although of peculiar value in the relations shown.

As many changes could be made in the above construction and many apparently widely different embodiments of our invention could be made without departing from the scope thereof, we intend that all matter contained in the above description or shown in the accompanying drawings shall be interpreted as illustrative and not in a limiting sense. We desire it also to be understood that the language used in the following claims is intended to cover all of the generic and specific features of the invention herein described and all statements of the scope of the invention, which as a matter of language, might be said to fall therebetween.

Having thus described our invention, what we claim as new and desire to secure by Letters Patent is:

1. In a front-strike typewriting machine, in combination, a vertically shiftable platen carriage, a pair of shift levers operable from the keyboard, a rock shaft actuated thereby, cam mechanism near the rear of the machine intermediate said levers and said platen carriage adapted to shift the carriage to a shifted position when actuated, and spring means operating through said rock shaft to aid in returning the platen carriage to normal position when the shift levers are released.

2. In a typewriting machine, in combination, a carriage, a fixed cam, and means connected with the carriage and adapted by a movement in one direction over said fixed cam to shift the carriage from initial position to a second position, said means also being adapted by a movement over said fixed cam in another direction to shift the carriage to a third position.

3. In a typewriting machine, in combination, a carriage, a fixed cam, and swinging means connected with the carriage and adapted to be moved in one direction over said fixed cam to shift the carriage from initial position to a second position and also adapted by a movement over said fixed cam in another direction to shift the carriage to a third position.

4. In a typewriting machine, in combination, a carriage, a fixed cam, and movable means connected with the carriage and adapted by a movement in one direction relative to said fixed cam to shift the carriage from initial position to a second position and also adapted by a movement in an opposite direction relative to said fixed cam to shift the carriage from initial position to a third position.

5. In a typewriting machine, in combination, a carriage, a fixed cam, and a swinging lever connected with the carriage and adapted by a movement in one direction over said fixed cam to shift the carriage from initial position to a second position and also adapted by a movement over said fixed cam in a different direction to shift the carriage to a third position.

6. In a typewriting machine, in combination, a carriage, a fixed cam provided with a cam path, and a swinging lever connected with the carriage and operating in said cam path and adapted by a movement in one direction to shift the carriage from initial position to a second position and also adapted by a movement thereof in an opposite direction to shift the carriage to still another position.

7. In a typewriting machine, in combination, a carriage, a fixed cam provided with a cam path and having a plurality of dwells therein, a swinging lever pivotally connected with the carriage and adapted to operate in said cam path, and means adapted to swing said lever in one direction to shift the carriage from initial position to a second position, one of said dwells determining such position, said means also being adapted to swing said lever in an opposite direction to shift the carriage to a third position, another of said dwells operating to determine the position of the carriage in said last-mentioned position.

8. In a typewriting machine, in combination, a carriage, a fixed cam provided with a cam path, said cam path having a plurality of cam surfaces, a swinging lever connected with the carriage, means journaled upon said swinging lever adapted to traverse said cam path, and means for moving said lever to cause the first-mentioned means carried thereby to traverse said cam path to shift the carriage from initial position to a second position, said cam path being so constructed as to determine the position of the carriage in said second position, said second-mentioned means being also adapted to swing said lever in another direction to cause the means carried thereby to traverse said cam path in another direction, thereby shifting the carriage to a third position, said cam path being so constructed as to determine said third position.

9. In a typewriting machine, in combination, a carriage, a fixed cam provided with a cam path having a plurality of dwells therein, a swinging lever pivotally connected with the carriage, a roller carried thereby adapted to operate in said cam path, and means adapted to move said swinging lever in one direction, thereby causing said roller to traverse said cam path to shift the carriage from initial position to a second position, such position being determined by one of said dwells, said last-mentioned means being also adapted to move said swinging lever in an opposite direction to cause said roller to traverse said cam path in a different direction to shift the carriage to a third position, said last-mentioned position being determined by another of said dwells.

10. In a typewriting machine, in combination, a carriage, a fixed cam provided with a cam path having a plurality of dwells therein, a swinging lever pivotally connected with the carriage, a roller carried by said swinging lever adapted to operate in said cam path, and means adapted to swing said lever in one direction to shift the carriage from initial position to a second position, the engagement of said roller with one of said dwells operating to determine such position, said means also being adapted to swing said lever in an opposite direction to shift the carriage to a third position, the engagement of said roller with another of said dwells operating to determine said last-mentioned position, said means being also adapted to shift the carriage from either second or third position to initial position, another of said dwells determining such position.

11. In a typewriting machine, in combination, a carriage, a fixed cam provided with a cam path, a swinging lever connected with the carriage and operating in said cam path, a rock shaft, means connecting said rock shaft with said swinging lever, said rock shaft by a movement in one direction being adapted to shift the carriage from initial position to a second position and also adapted by a movement in the opposite direction to shift the carriage to still another position, and means operating upon said rock shaft to return the carriage to initial position from either of its shifted positions, said means also operating normally to maintain the carriage in initial position.

12. In a typewriting machine, in combination, a carriage, a fixed cam provided with a cam path, a swinging lever connected to the carriage and operating in said cam path, a pair of shift levers, a rock shaft adapted to be operated by the shift levers, a connection between said rock shaft and said swinging lever, a rocker member positioned upon said rock shaft, said rocker member being adapted to be operated by one of said shift levers to shift the carriage from initial position to a second position and also being adapted to be operated by another of said shift levers to shift the carriage to a third position, and spring-controlled means engaging said rocker member adapted to return the same to its normal position upon its being rocked in either direction.

13. In a typewriting machine, in combination, a carriage, a fixed cam provided with a cam path, a swinging lever connected to the carriage and operating in said cam path and adapted by a movement in one direction to shift the carriage from initial position to a second position and also adapted by a movement thereof in the opposite direction to shift the carriage to still another position, a rock shaft, connections between said rock shaft and said swinging lever, a rocker member upon said rock shaft, a pair of shift levers, means adapted to be operated by each of said shift levers to engage said rocker member, and spring-controlled means adapted to return said rocker member to its normal position when the same is rocked in either direction through said last-mentioned means.

14. In a typewriting machine, in combination, a carriage, a fixed cam provided with a cam path, a swinging lever connected with the carriage and operating in said cam path adapted by a movement in one direction to shift the carriage from initial position to a second position and also adapted by a movement thereof in the opposite direction to shift the carriage to still another position, a rock shaft, connections between said rock shaft and said swinging lever, a pair of shift levers, a rocker member positioned upon said rock shaft, lever arms connected with said shift levers, one of said lever arms when operated by its shift lever being adapted to engage said rocker member to impart a partial rotation to said rock shaft, the other of said lever arms being adapted when operated by its shift lever to impart a movement to said rocker member in the opposite direction, and a spring-controlled tilt bar free from said rocker member but in constant engagement therewith adapted to return the same to its normal position when rocked in either direction.

15. In a typewriting machine, in combination, a shiftable platen carriage, a rock shaft, cam mechanism interposed between said rock shaft and the platen carriage adapted when said rock shaft is actuated to shift the carriage, and spring mechanism operating through said rock shaft to return the platen carriage to normal position when the same has been shifted and for holding it in such position.

16. In a typewriting machine, in combination, a shiftable platen carriage adapted normally to lie in a central position with respect to the types, a key actuated rock shaft, cam mechanism interposed between the platen carriage and said rock shaft adapted when the latter is rocked in opposite directions to shift the platen carriage in opposite directions from its normal central position, a pair of arms extending in opposite directions from said rock shaft, and a spring controlled member engaging said arms and holding the rock shaft in its normal position.

17. In a typewriting machine, in combination, a shiftable platen carriage adapted normally to lie in a central position with respect to the types, a rock shaft, cam mechanism interposed between said rock shaft and the platen carriage and adapted to shift the same to different printing positions when said rock shaft is actuated, oppositely extending arms mounted upon said rock shaft, a pair of shift levers each of which has a portion adapted to engage with one of said arms whereby said rock shaft may be actuated, and a spring controlled member engaging said arms and holding said rock shaft in normal position whereby the carriage will be held in its normal central position.

18. In a typewriting machine, in combination, a shiftable platen carriage, a rock shaft, cam mechanism interposed between said rock shaft and the platen adapted when said rock shaft is operated to shift the platen to different printing positions, said rock shaft being provided with a pair of oppositely extending arms, a pair of shift levers each of which is provided with a portion which normally lies in a position disengaged from one of said arms but is adapted to be swung in engagement therewith when depressed, and a spring controlled member engaging said arm and holding the rock shaft in normal position.

19. In a typewriting machine, in combination, a shiftable platen carriage adapted normally to lie in a central position with respect to the types, a rock shaft, cam mechanism interposed between said platen carriage, said rock shaft adapted when the latter is rocked to shift the platen carriage, a pair of oppositely extending arms mounted upon said rock shaft, a pair of shift levers each of which is provided with a portion which normally lies out of the path of said arms when said rock shaft is actuated but which is adapted to be swung into engagement therewith when the shift lever is depressed, and a spring controlled member engaging said arms and holding the rock shaft in normal position.

20. In a typewriting machine, in combination, a shiftable platen carriage, a rock shaft, cam mechanism interposed between said rock shaft and the platen carriage adapted when said rock shaft is actuated to shift the carriage, arms on said rock shaft, and spring mechanism operating through said arms and rock shaft to return the platen carriage to normal position when the same has been shifted.

21. In a typewriting machine, in combination, a double shift platen carriage, key actuating means therefor, and intermediate mechanism comprising a link connected with said carriage, and a cam surface engaged by the opposite end of said link, said cam surface having two curved portions substantially concentric with respect to the point of connection between said link and said carriage, and an intermediate portion adapted to shift the carriage in both directions.

In testimony whereof we affix our signatures, in the presence of two witnesses.

WELLINGTON P. KIDDER.
CHARLES W. SPONSEL.

Witnesses:
JOSIAH H. PECK,
CORA A. KLEIN.

Copies of this patent may be obtained for five cents each, by addressing the "Commissioner of Patents, Washington, D. C."